Dec. 29, 1959  W. V. SMITH  2,919,219
LOW FRICTION LAMINATED PHENOLIC BEARING MATERIALS
Filed Dec. 30, 1955
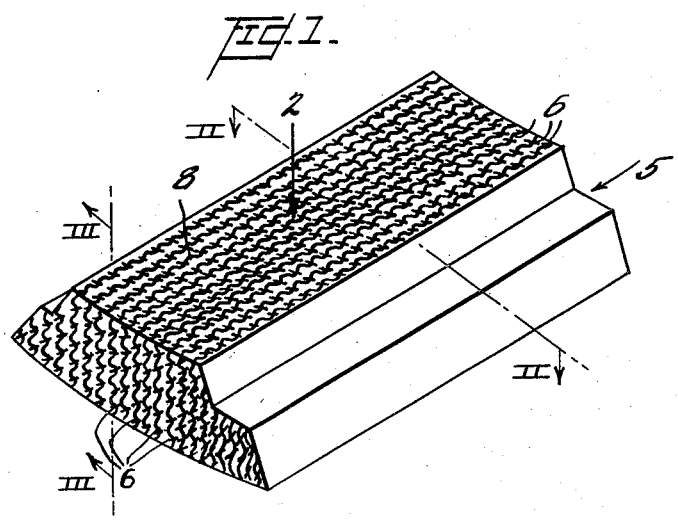
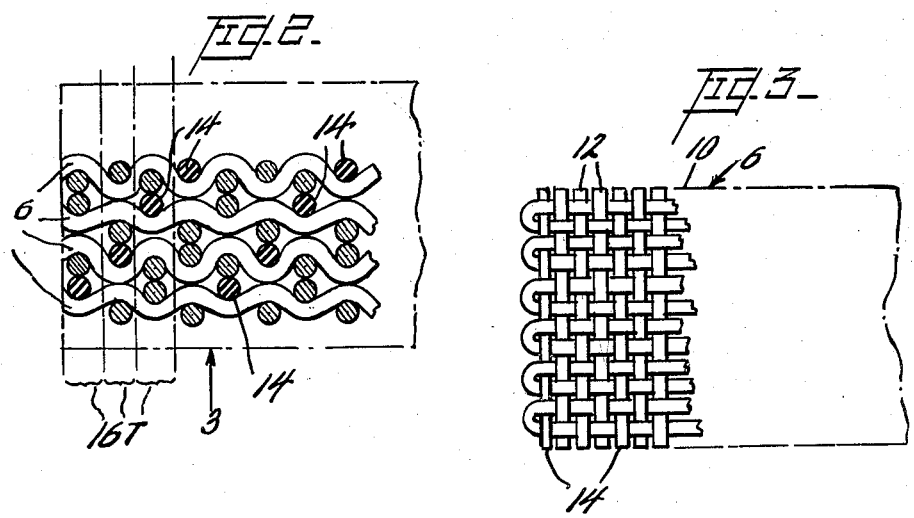
INVENTOR
Watt V. Smith,
BY George Sipkin
B. L. Zangwill
ATTORNEYS

United States Patent Office 2,919,219
Patented Dec. 29, 1959

2,919,219

LOW FRICTION LAMINATED PHENOLIC BEARING MATERIALS

Watt V. Smith, Severna Park, Md.

Application December 30, 1955, Serial No. 556,754

3 Claims. (Cl. 154—125)

(Granted under Title 35, U.S. Code (1952), sec. 266)

The invention described herein may be manufactured and used by or for the Government of the United States of America for governmental purposes without the payment of any royalties thereon or therefor.

This invention relates to a bearing stave of the laminated type and the method of manufacture thereof, and more particularly to a self-lubricating bearing stave of the laminated type.

The prior art self-lubricating bearing staves are composed of a lamination of a number of layers of fabric, said layers being pre-treated with synthetic resin and then bonded together under heat and pressure. The self-lubricating feature is achieved by impregnating or coating a certain number of the threads of each layer of fabric with either graphite or grease. A disadvantage in the use of graphite is that the graphite has a tendency to become scattered over the entire area of the fabric, instead of remaining confined to only certain of the threads, thereby inhibiting proper bonding together of the superimposed layers, by the resin; the same disadvantage prevails where grease is used. Further, graphite has a tendency to weaken the overall bearing structure, thereby leading to very rapid wear. The use of grease has the further disadvantage in that the life of grease is not indefinite, and regreasing is usually impractical, particularly where the bearing is used under water, as in the case of a strut bearing for a ship propeller shaft.

An object of this invention is to provide a bearing having a low coefficient of static friction.

A further object is to incorporate within a self-lubricating bearing a non-destructible source of lubricant.

Still a further object is to provide a means whereby a solid lubricant is incorporated into a self-lubricating bearing.

Another object is to provide means whereby Teflon (polytetrafluoroethylene) may be utilized as a lubricant in a self-lubricating bearing made of laminated sheets of fabric.

Other objects and many of the attendant advantages of this invention will be readily appreciated as the same becomes better understood by reference to the following detailed description when considered in connection with the accompanying drawings wherein:

Fig. 1 is a perspective view of a bearing stave made in accordance with the invention;

Fig. 2 is an enlarged view of the bearing surface of the stave as taken on line II—II of Fig. 1; and Fig. 3 is an elevational view, taken on line III—III of Fig. 1, showing one of the sheets of fabric that is incorporated in the bearing stave shown in Fig. 1.

Referring now to the drawings, wherein like reference characters designate like or corresponding parts throughout the several views, there is shown in Fig. 1 a perspective view of a bearing stave 5 adapted to be used in the manner described in U.S. Letters Patent 2,409,267 issued to T. L. Gatke. The bearing stave 5 is composed of a number of layers of fabric 6 placed in surface contact with one another, each of said layers being pre-treated with a synthetic resin of the phenolic type, the combination of layers 6 being bonded into a single laminated unit by the application of heat and pressure thereto. It is pointed out that all of the layers of fabric 6 in the stave 5 are arranged, before the bonding together thereof, so that they are in edgewise relation to the bearing surface 8. The bearing surface 8 is therefore composed of the edges 10 of the layers of fabric 6 so that the ends 12 of certain of the threads forming each layer, together form the bearing surface 8.

In accordance with the invention each bearing stave 5 has incorporated therein, in one manner or another, a quantity of polytetrafluoroethylene, which will hereinafter be referred to by its trade name of Teflon. The very low coefficient of friction of Teflon, particularly its low starting coefficient of friction, which ranges from .04 to .06, makes it highly desirable as a bearing material. However, the comparatively high cost of Teflon makes it impractical to make an entire bearing thereof, particularly where a large bearing of the ship propeller shaft type is concerned. Further, it is quite difficult to bond Teflon to other substances. It is therefore the primary objective of this invention to provide a relatively inexpensive means for utilizing the highly desirable anti-friction qualities of Teflon.

In the preferred embodiment of the invention each layer of fabric 6 that goes into the formation of the laminated bearing stave has incorporated therein, at the time it is woven, a number of Teflon threads 14. In order to avoid changing shuttles, it is preferable to incorporate the Teflon threads among the warp threads, rather than the weft, or filler threads.

Since Teflon is comparatively expensive, as pointed out above, only certain of the warp threads are made of Teflon and the remainder are made of cotton or the like. This feature is clearly shown in Figs. 2 and 3. In order that there be at least one Teflon thread end in each transverse row 16–T of thread ends in the bearing face 8, the layers of fabric 6 are arranged, prior to the molding or bonding step, so that the Teflon thread ends are in staggered relation transversely of the bearing face 8; this feature is shown in Fig. 2.

It is pointed out that it is not necessary that each thread in a particular transverse row of threads 16–T be made of Teflon, since the rubbing action of a shaft across the bearing surface 8 will gradually rub enough Teflon off the Teflon threads 14 to cover the ends of the adjacent cotton threads, and thus ultimately all the thread ends and therefore the entire bearing face will become covered with Teflon. Thus, in the preferred embodiment of the invention, as illustrated in Fig. 2, the layers of fabric are arranged so that the Teflon thread ends are staggered from one transverse row 16–T to another. This arrangement materially reduces the number of Teflon threads required per bearing stave.

A modification of the invention consists of providing a greater or lesser number of cotton, or the like, threads between each Teflon thread, thereby varying the number of Teflon thread ends in each transverse row 16–T; this provides a means for varying the amount of Teflon that is available for lubrication purposes.

A further modification, consists of sandwiching strips of Teflon between successive layers of fabric 6, so that the end of each strip intersects the bearing face. In this modification the Teflon strips are arranged so that the strip ends are in staggered relation, in much the same manner as the Teflon thread ends shown in Fig. 2.

A still further modification consists of the incorporation of granules of Teflon between successive layers of fabric prior to the bonding step. A portion of each of the granules adjacent the bearing face 8 is rubbed off and ultimately the bearing face becomes covered with Teflon.

In order to insure that the Teflon elements are exposed at the bearing surface 8 after the molding together of the layers of fabric, said surface is machined, or otherwise cut, after the molding operation, thereby removing any resin or other material that might cover the Teflon.

Thus, it can be seen that the applicant has provided an improved laminated bearing structure that includes means whereby the bearing surface becomes coated with Teflon. The applicant's structure therefore provides a means for obtaining the benefits of the low coefficient of friction of Teflon, without incurring the expense of a bearing made entirely of Teflon.

What is claimed is:

1. The method of making a self-lubricating bearing comprising the steps of placing a plurality of layers of woven fabric in surface contact with one another, each of said layers of fabric being woven of a plurality of threads, certain only of said threads being made of polytetrafluoroethylene, said layers being so arranged that the threads of polyfluorotetraethylene in one layer are diagonally spaced from those in adjacent layers, bonding said layers together, machining a surface of the resultant product at right angles to the direction of the threads of polyfluorotetraethylene, so as to provide a bearing surface.

2. A molded composition bearing in which layers of treated fabric are arranged in edgewise relation to the bearing face, said bearing face being a cut surface, whereby the edges of said layers are exposed at said face, each of said layers being woven of a plurality of threads, certain only of said threads being made of polytetrafluoroethylene, each of the threads of polytetrafluoroethylene having an end portion intersecting and exposed at the bearing face; and said layers of fabric being arranged in surface contact with one another so that the threads of polytetrafluoroethylene in one layer are diagonally spaced from those in adjacent layers.

3. A molded composition bearing of the type set forth in claim 2, wherein the threads of polytetrafluoroethylene, in each layer of fabric, are separated by cotton threads.

References Cited in the file of this patent

UNITED STATES PATENTS

| | | |
|---|---|---|
| 2,393,017 | Boyd et al. | Jan. 15, 1946 |
| 2,409,267 | Gatke | Oct. 15, 1946 |
| 2,580,438 | Knoblaugh | Jan. 1, 1952 |
| 2,622,949 | Cotchett | Dec. 23, 1952 |
| 2,667,389 | Smith | Jan. 26, 1954 |
| 2,672,443 | Screnock | Mar. 16, 1954 |
| 2,711,828 | Webb et al. | June 28, 1955 |
| 2,757,109 | Martello | July 31, 1956 |
| 2,773,781 | Rodman | Dec. 11, 1956 |
| 2,804,886 | White | Sept. 3, 1957 |
| 2,840,881 | Bateman | July 1, 1958 |

OTHER REFERENCES

"Automotive Industries," September 1954, pp. 107–108.